March 10, 1964   W. F. TRAUGOTT   3,124,369
VEHICLE IDLER ARM MOUNTING
Filed July 27, 1961   3 Sheets-Sheet 3
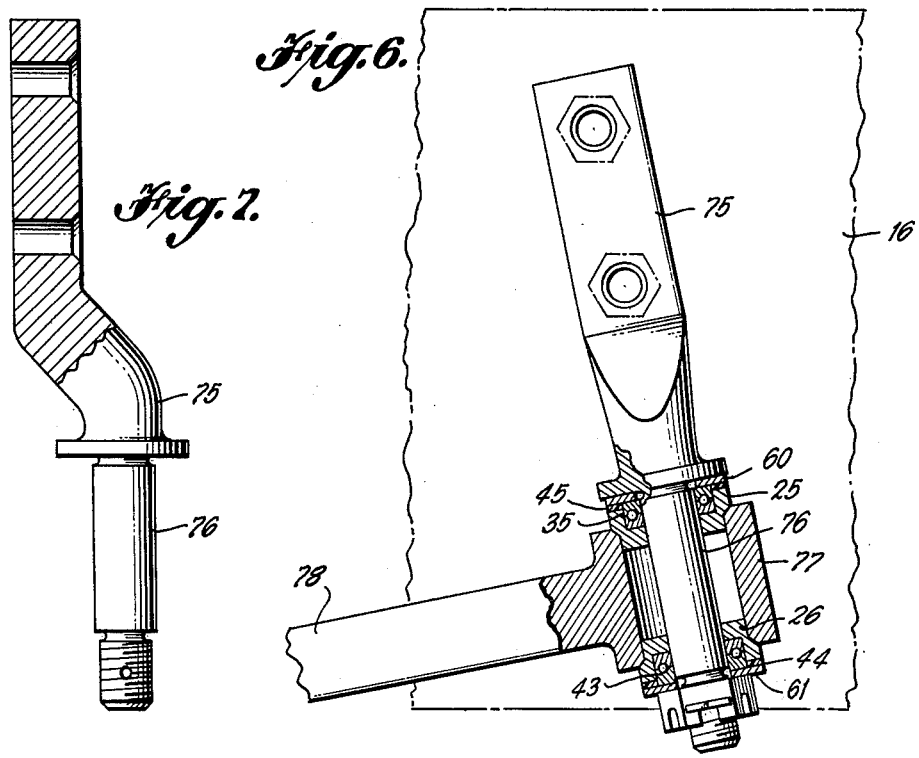
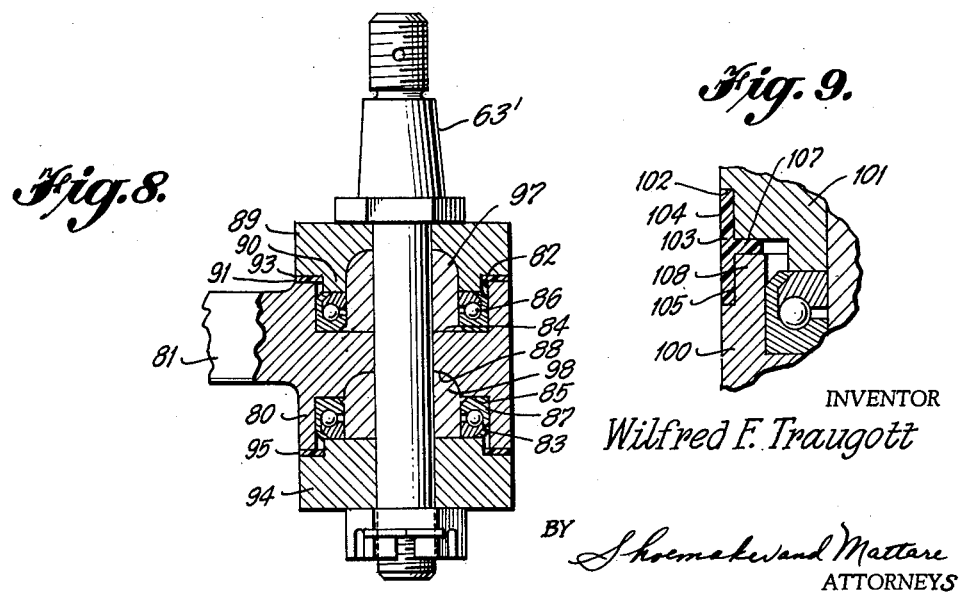
INVENTOR
Wilfred F. Traugott
BY Shoemaker and Mattare
ATTORNEYS

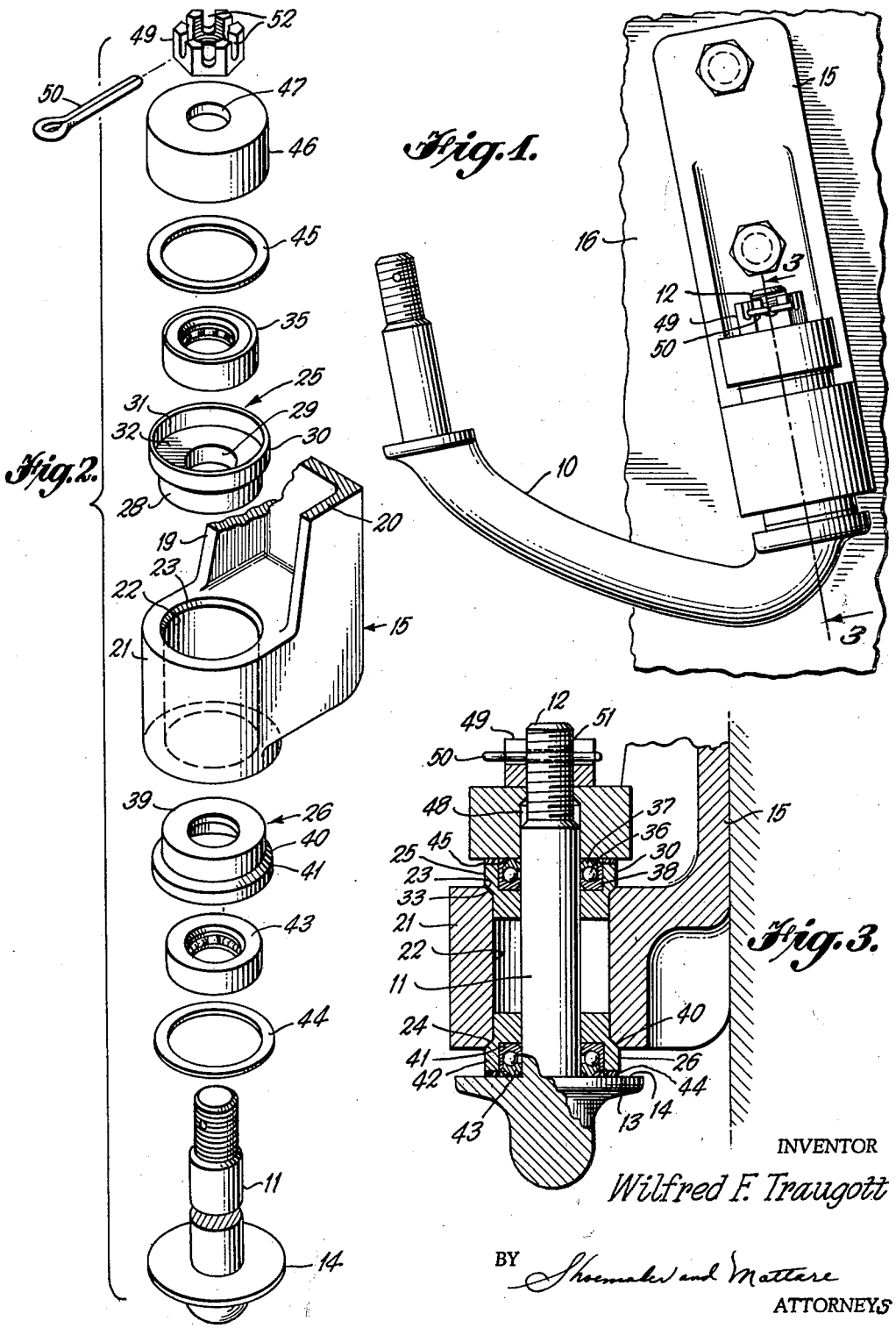

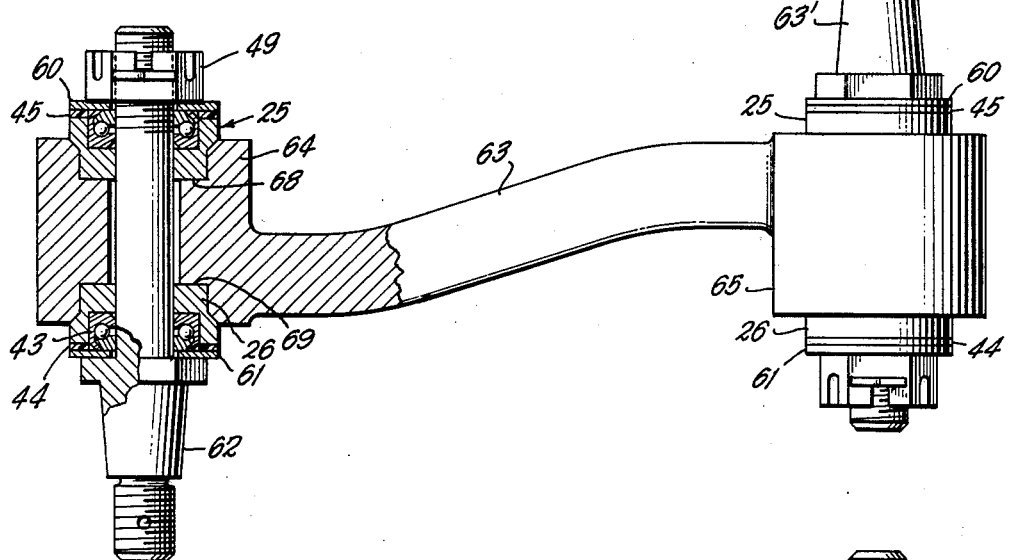
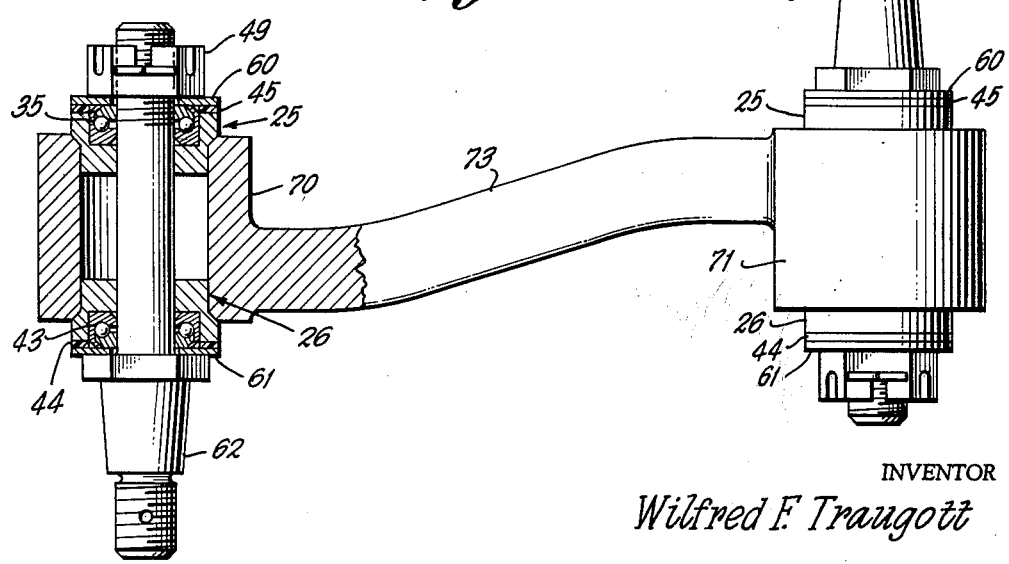

3,124,369
VEHICLE IDLER ARM MOUNTING
Wilfred F. Traugott, Box 608, West Point, Va.; Bertha D. Traugott, executrix of the estate of said Wilfred F. Traugott, deceased
Filed July 27, 1961, Ser. No. 127,183
4 Claims. (Cl. 280—95)

This invention relates to motor vehicle steering assemblies and more particularly to an idler arm bracket mounting for the idler arm used in connection with said steering mechanism.

An object of the present invention is to provide an idler arm bracket mounting that may be installed on vehicles now in use without requiring any change in the original manufacturer's parts.

Another object of the present invention is to provide an idler arm bracket mounting for replacing worn idler arm bracket mountings presently used on vehicles.

Another object of the present invention is to provide an idler arm bracket mounting in which the steering geometry of the steering gear of a vehicle is maintained at manufacturers' specifications or standards.

Another object of the present invention is to provide an improved idler arm bracket mounting that uses manufacturers' standard parts and that provides two points of support and in which the assembly is of simple and economical construction.

Another object of the present invention is to provide an idler arm bracket mounting for supporting an idler arm that may replace the mountings presently used in vehicles on the road by unskilled labor.

Another object of the present invention is to provide an idler arm bracket mounting that can be used to replace worn idler arm bracket mountings for idler arms that have the stud member formed integral therewith, or for idler arms that have the hub member formed integral with it.

Various other objects and advantages of the present invention will be readily apparent from the following detailed description when considered in connection with the accompanying drawings forming a part thereof, and in which:

FIG. 1 is a side elevational view of the idler arm bracket mounting embodied in the present invention;

FIG. 2 is an exploded view of the idler arm bracket mounting embodying the present invention;

FIG. 3 is a longitudinal section taken on lines 3—3 of FIG. 1, with part of the idler arm stud shown in full for purposes of illustration;

FIG. 4 is a side elevational view of an idler arm bracket mounting with parts in section, of a modified form of the invention wherein the idler arm has a hub member formed integral therewith;

FIG. 5 is a side elevational view of an idler arm bracket mounting, partly in section, of still another modification of the invention wherein the idler arm has a hub member formed integral therewith;

FIG. 6 is an elevational view of the idler arm bracket mounting embodied in the present invention, similar to the modification in FIGS. 4 and 5, except that the stud member is formed integral with the frame bracket disposed on the vehicle chassis;

FIG. 7 is a side elevational view partly broken away and in cross section of the frame bracket and stud member shown in FIG. 6;

FIG. 8 is a side elevational sectional view of another modification of the invention shown in FIG. 4; and FIG. 9 is a fragmentary enlarged sectional view of a slightly modified version of the washer sealing means embodied in FIG. 8.

Referring to the drawings, the reference numeral 10 generally designates a conventional idler arm provided with a spindle or vertical stud or shaft 11 on one end thereof. The shaft is provided with an upper externally threaded necked end 12 and an enlarged boss or collar 13 on the lower end of the shaft forming a peripheral or laterally extending annular surface 14.

The shaft is mounted for pivotal or axial movement with respect to a frame bracket 15 which in turn is fixedly mounted by bolt members to the chassis or frame 16 of a vehicle.

The lower end of the bracket 15 is bifurcated as at 19 and 20 (FIG. 2) and terminates in a cylindrical hub 21 (FIG. 2) having a vertical cylindrical opening or bore 22 extending therethrough. The upper and lower edges of the bore are provided with shoulders 23 and 24 formed by bevelling or tapering the edges of the bore.

The bore 22 of the hub is adapted to receive two mounting members or sleeves 25 and 26 respectively, therein. Sleeve 25 comprises a circular disc portion 28 having a central opening or bore 29 therein and an upper enlarged sleeve or skirt portion 30 having an enlarged countersink or recess 31 therein providing a laterally extending bearing surface 32 on which is supported a ball bearing assembly, as hereinafter described. The upper mounting member 25 has a tapered shoulder 33 (FIG. 3) on the outer periphery thereof adjacent to the point where circular disc portion 28 joins the enlarged skirt portion 30, the shoulder being formed by an outwardly flared or bevelled surface 33. Surface 33 is adapted to mate with or seat against the bevelled surface of shoulder 23 of the hub, as clearly illustrated in FIG. 3. The enlarged bore or recess 31 of this mounting member 25 has disposed therein a ball bearing assembly or thrust bearing 35 consisting of a plurality of balls 36 positioned between upper and lower races 37 and 38, respectively. The upper portion of the ball bearing assembly extends slightly above the upper edge of the recess 31.

The lower mounting member or sleeve 26 is similar to the upper mounting member 25 and has a circular disc portion 39 which fits into the lower end of hub 21 so that its tapered shoulder 40, similar to shoulder 33 on the upper member 25, seats against the corresponding shoulder 24 provided adjacent the lower edge of the hub. The enlarged sleeve or skirt 42 of the lower mounting member is similar to the corresponding sleeve 30 of the upper member, and is provided with an enlarged recess or bore 41 adapted to receive a ball bearing member or thrust bearing assembly 43 similar to the upper ball bearing member 35.

The stud or shaft 11 of the idler arm extends through hub 21 and has an annular nylon washer 44 disposed thereon. The ball bearing assembly 43 abuts surface 14 of the collar 13 inwardly of the nylon washer 44 and lower mounting member 26 is mounted on the stud 11 so that the lower end of sleeve or skirt portion 42 seats on washer 44 as shown in FIG. 3, with ball bearing 43 being disposed within bore 41 of the mounting member and completely surrounded by skirt 42 and the nylon washer 44 so that the grease or lubricant in the ball bearing cannot escape.

The upper mounting member or sleeve 25 extends into the bore 22 of the hub and is mounted on the upper portion of stud 11 so that its shoulder 33 rests against the complementary shoulder 23 on the upper rim of the hub. The upper ball bearing member 35 fits into bore 31 of the mounting member, and an annular nylon washer 45 similar to washer or gasket 44, is disposed on the upper edge of skirt 30 so that the ball bearing is completely enclosed or surrounded by skirt 30 and this nylon washer to prevent any grease or lubricant with which the ball bearing is lubricated from escaping, and to prevent dirt and moisture from entering the bearing. Disposed on the upper end of stud 11 is a cylindrical collar, bushing or spacer member 46 having a central opening 47 in the upper end thereof communicating with a lower enlarged bore 48 extending therethrough as clearly illustrated in FIG. 3. The threaded end 12 of the stud is provided with a hexagonal nut 49 adapted to be threaded against spacer 46 to properly secure the parts thereon so that the stud may be pivotally moved with respect to the frame bracket 15, and so that collar 46 and the stud 11 are rotated together, while the remaining portions of the idler arm bracket mounting remain stationary. A cotter pin 50 is inserted through a horizontal opening 51 extending through the nut to prevent the nut from becoming loosened. The cotter pin extends through the slots or serrations 52 disposed in each face of the nut sides.

The modification of the invention shown in FIG. 4 is substantially the same as that in FIG. 1, except that annular metal end washers 60 and 61, are mounted on the stud member 62. The upper annular washer 60 is disposed between the nut 49 and upper nylon washer 45 so that it seats against this nylon washer 45 and the upper end of ball bearing member 35 to completely cover the ball bearing and prevent any moisture from getting into it, and prevent any lubricant from leaking out of the bearing.

The lower annular end washer 61 is disposed adjacent the outer end of lower ball bearing 43 and nylon washer 44 so as to protect this ball bearing in the same manner as the upper ball bearing member is protected. It will also be noted that there is no spacer member, such as member 46, mounted on the shaft of the embodiment shown in FIG. 1.

It will also be noted that the idler arm 63 has oppositely disposed hub members 64 and 65 formed integral therewith, instead of the hub member being formed integral with the frame bracket 15, such as the hub member 21 in the embodiment of the invention in FIG. 1. It will be further noted that by providing a hub member on each end of the idler arm, bracket mountings embodied in the invention may be disposed on both ends of the idler arm so that stud member 62 may be connected to a drag link in the steering mechanism, while an identical stud member 63' may extend through the other hub member 65 and be connected to the chassis of a vehicle.

In FIG. 4, the hub member 64, as well as hub 65 have upper and lower shoulders 68 and 69 respectively, against which the inner ends of sleeve members 25 and 26 seat, respectively.

The embodiment of the invention disclosed in FIG. 5 is similar to that shown in FIG. 4, except that hubs 70 and 71 on opposite ends of the idler arm 73, are similar to the hub member 21 disclosed in FIG. 1, and do not have the additional shoulders 68 and 69 for the sleeve members 25 and 26 to bear against.

The embodiment of the invention disclosed in FIGS. 6 and 7 is substantially the same as that shown in FIG. 4, except that the frame bracket 75 terminates in the stud member 76 which extends through the hub 77 of an idler arm 78, or in other words, the stud member is formed integrally with the frame bracket 75, instead of being formed integrally with an idler arm, such as the idler arm 10 in FIG. 1.

The embodiment of the invention disclosed in FIG. 8 is substantially the same as that shown in FIG. 4 in which the stud member 63' extends through the hub member 80 of the idler arm 81. The hub member 80 is provided with an upper cylindrical recess 82 and a lower cylindrical recess 83 having shoulders 84 and 85 formed respectively by the bottom of the recess. These recesses are relatively deeper than the recess forming the shoulders 68 and 69 in the embodiment of FIG. 4 in order to enclose the upper ball bearing 86 and the lower ball bearing 87, as clearly shown in the figure. It will also be noted that recess 82 extends completely across the hub member to the central opening therein, while recess 83 likewise extends to the central opening through the hub member but has a deeper axial recess 88 therein. An upper bushing or spacer member 89 having a downwardly extending flange 90 is mounted on the stud member 63' and bears against the ball bearing 86. An annular washer 91 is positioned between the upper edge of the hub member and the shoulder 93 formed in the bushing adjacent the outer side of flange 90. A lower bushing 94 is mounted on the stud 63' and bears against the lower bearing 87. An annular washer 95 is positioned between the lower end of the bearing and the upper annular shoulder 96 formed in the bushing so as to completely seal the bearing 87 therein. Grease is packed in the chambers 97 and 98 defined adjacent the inner sides of the bearings 86 and 87 by the recesses 82 and 83.

The embodiment of the invention in FIG. 9 is substantially the same as that in FIG. 8 except that the upper end of the hub 100 and the lower end of the bushing or spacer member 101 are provided with a continuous groove 102 in the outer circumference thereof to receive a T-shaped annular washer 103 having an upper leg 104 forming a press fit with the spacer member and a lower leg 105 forming a turning fit or free fit with the hub 100. The horizontal leg 107 of the washer terminates slightly adjacent the inner end of the hub flange 108.

With this embodiment of the invention, grease can be packed into the assembly upon initial assembly thereof and it will last for the serviceable life of the vehicle on which the idler arm bracket mounting is used requiring no further maintenance whatsoever.

It is readily apparent that the present invention provides an idler arm bracket mounting in which ball bearings are completely enclosed within the mounting members or sleeves that are readily insertable within the bore of the hub of a frame bracket to prevent any dirt from entering the ball bearing and to prevent any lubricant from being discharged therefrom to provide permanent mounting means for an idler arm on vehicles presently in use. It will be further observed that the idler arm bracket mounting of the present invention can readily replace worn rubber mountings now in use in different vehicles so that it will last for the serviceable life of the car.

It will be further observed that the idler arm bracket mounting provides an improved assembly in which the steering geometry of the steering gear of a vehicle is maintained at the manufacturer's specification, and can be easily installed by untrained personnel.

Another feature of the invention is that the idler arm bracket mounting of the present invention can be used to replace an idler arm bracket mounting for either an idler arm in which the stud member is formed integral with the idler arm, or for an idler arm in which the hub member is formed integral with the idler arm.

Inasmuch as various changes may be made in the form, location and relative arrangement of the several parts without departing from the essential characteristics of the invention, it will be understood that the invention is not to be limited except by the scope of the appended claims.

I claim:
1. A bracket mounting for connecting an idler arm of a vehicle thereto, in which the idler arm is secured to said bracket mounting through a hub member and a stud member pivotally joined to each other, said hub member having a bore extending therethrough, mounting sleeves extending into each end of said bore, a ball bearing disposed in each of said sleeves, said stud member comprising an elongated substantially cylindrical member and extending through and being surrounded by said hub member, said sleeves and said bearings for pivotal movement with respect thereto, a flange portion formed integral with said stud member in a one-piece construction and extending radially outwardly thereof at least a distance approximately equal to the outer radius of the adjacent sleeve, locking means for detachably securing said stud member in said hub member, spacer means adjacent said locking means and extending radially outwardly at least a distance approximately equal to the outer radius of the adjacent sleeve, gasket means disposed adjacent the outer end portion of each of said sleeves, one of said gasket means being interposed between the end portion of the associated sleeve and said integral flange, the other of said gasket means being interposed between the end of the associated sleeve and said spacer means, each of said gasket means cooperating with its associated sleeve to enclose the associated ball bearing to prevent lubricant from escaping from the bearing.

2. The bracket mounting defined in claim 1 wherein said sleeve members comprise a circular disc portion with a central opening therein and a skirt portion with an enlarged bore, and said ball bearings are disposed in said enlarged bores.

3. The bracket mounting as defined in claim 1 wherein said idler arm has said hub member formed integral therewith.

4. The bracket mounting as defined in claim 1 wherein said idler arm has said stud member formed integral therewith.

References Cited in the file of this patent

UNITED STATES PATENTS

| | | |
|---|---|---|
| 2,095,566 | Lundelius et al. | Oct. 12, 1937 |
| 2,809,049 | Carlson | Oct. 8, 1957 |
| 2,853,327 | Traugott | Sept. 23, 1958 |
| 3,010,733 | Melton et al. | Nov. 28, 1961 |
| 3,010,746 | Melton et al. | Nov. 28, 1961 |
| 3,072,448 | Melton | Jan. 8, 1963 |

FOREIGN PATENTS

| | | |
|---|---|---|
| 283,965 | Switzerland | Nov. 1, 1952 |